US008347402B2

(12) United States Patent  
Imrey et al.

(10) Patent No.: US 8,347,402 B2  
(45) Date of Patent: Jan. 1, 2013

(54) SOFTWARE DEVELOPMENT AND DISTRIBUTION WORKFLOW EMPLOYING META-OBJECT TIME STAMPING

(75) Inventors: G. Christopher Imrey, Newport Beach, CA (US); William J. House, III, Corona del Mar, CA (US)

(73) Assignee: Apollo Enterprise Solutions, Inc., Long Beach, CA (US)

( * ) Notice: Subject to any disclaimer, the term of this patent is extended or adjusted under 35 U.S.C. 154(b) by 299 days.

(21) Appl. No.: 12/657,192

(22) Filed: Jan. 15, 2010

(65) Prior Publication Data

US 2011/0179280 A1    Jul. 21, 2011

(51) Int. Cl.
*H04L 9/00*       (2006.01)
(52) U.S. Cl. .......................................... 726/27; 713/178
(58) Field of Classification Search .................. 713/165, 713/178; 707/694, 705–708, 755, 769, 781; 717/100, 120, 124, 128, 131, 140; 726/26–30
See application file for complete search history.

(56) References Cited

U.S. PATENT DOCUMENTS

| 5,893,117 | A | 4/1999 | Wang |
| 6,125,371 | A | 9/2000 | Bohannon et al. |
| 6,285,997 | B1 * | 9/2001 | Carey et al. ............................. 1/1 |
| 2007/0050431 | A1 * | 3/2007 | Vaidya et al. ................. 707/204 |
| 2009/0049108 | A1 | 2/2009 | Forde et al. |

* cited by examiner

*Primary Examiner* — Hosuk Song  
(74) *Attorney, Agent, or Firm* — Smyrski Law Group, A P.C.

(57) ABSTRACT

A method and system facilitating the development and distribution of software is provided. The system includes a database provided on a computing device, the computing device configured to enable users to provide an update to an element of the database, wherein the element is associated with an object. The system further includes time stamp tracking software configured to enable revisions to elements of the database by establishing time stamps for each stored element changed at a specified time and an assembler configured to enable a user to assemble elements for execution based on time stamping.

16 Claims, 13 Drawing Sheets

| 810 | 820 | 830 | 840 | 850 | 860 | 870 |
|---|---|---|---|---|---|---|
| 10/29/09 | 9:05:00 | 1 | formula | CL 1 | CL 2 | CL 3 |
| 10/29/09 | 10:05:59 | 2 | text | | CL 2 | CL 3 |
| 10/29/09 | 12:52:03 | 3 | formula | CL 1 | CL 2 | |
| 10/29/09 | 10:01:08 | 4 | text | | CL 2 | CL 3 |
| 10/29/09 | 15:10:19 | 5 | text | CL 1 | CL 2 | CL 3 |
| 10/29/09 | 16:40:45 | 6 | image | | CL 2 | |
| 10/29/09 | 9:45:23 | 7 | formula | CL 1 | CL 2 | CL 3 |
| 10/29/09 | 15:30:11 | 8 | image | CL 1 | CL 2 | |
| 10/29/09 | 10:01:47 | 9 | voice | CL 1 | CL 2 | |
| 10/29/09 | 9:30:52 | 10 | voice | CL 1 | | |
| 10/29/09 | 10:01:08 | 11 | formula | | CL 2 | |
| 10/29/09 | 16:22:02 | 12 | formula | | CL 2 | CL 3 |

FIG. 8

SOFTWARE DEVELOPMENT AND DISTRIBUTION WORKFLOW EMPLOYING META-OBJECT TIME STAMPING

REFERENCE TO CO-PENDING APPLICATIONS FOR PATENT

The present application for patent is related to the following co-pending U.S. patent applications:

"System and Method for Resolving Transactions with Lump Sum Payment Capabilities", having Ser. No. 12/657,222, filed concurrently herewith, assigned to the assignee hereof;

"System and Method for Resolving Transactions with Variable Offer Parameter Selection Capabilities", having Ser. No. 12/657,215, filed concurrently herewith, assigned to the assignee hereof;

"System and Method for Resolving Transactions with Selective Use of User Submission Parameters", having Ser. No. 12/657,223, filed concurrently herewith, assigned to the assignee hereof;

"System and Method for Resolving Transactions Using Weighted Scoring Techniques", having Ser. No. 12/657,201, filed concurrently herewith, assigned to the assignee hereof;

"System and Method for Resolving Transactions Employing Goal Seeking Attributes", having Ser. No. 12/657,231, filed concurrently herewith, assigned to the assignee hereof;

"System and Method for Resolving Transactions Employing Optional Benefit Offers"; having Ser. No. 12/657,206, filed concurrently herewith, assigned to the assignee hereof; and "System and Method for Resolving Transactions Employing Automated Offer Optimization", having Ser. No. 12/657,221, filed concurrently herewith, assigned to the assignee hereof.

The entirety of these applications being filed concurrently herewith is expressly incorporated herein by reference.

BACKGROUND OF THE INVENTION

1. Field of the Invention

The present invention relates in general to software, and more specifically to systems and methods involving meta-objects or metadata.

2. Description of the Related Art

Software coding generally includes techniques and tools for following a standard software development life cycle (SDLC) methodology and associated workflow model. Software application designers following the current SDLC workflow model are exposed to a number of inherent limitations that become problematic when attempting to efficiently develop applications. For example, in order to promote new code to the production server, the production server must be removed from service, or in other words the currently running software release is shut down in order to overwrite or update the application with new files.

This can become further problematic when a newly deployed production application must be "rolled back" to the previous version. By adhering to the requirement to keep versions separate, application providers are limited to operating and executing only one configuration of the application in a single instance. Binary code is frequently modified within multiple different application instances. Application providers must deploy multiple different hardware stacks to support concurrent execution of different release and version levels. Each time a change, modification, or feature enhancement is introduced, a separate build process involving a complete recompilation of the entire application under construction is required.

In light of the above, it would be desirable to simplify the complexities found in today's software application development environments.

SUMMARY OF THE INVENTION

According to one aspect of the present design, there is provided a system including a database provided on a computing device, the computing device configured to enable users to provide an update to an element of the database, wherein the element is associated with an object. The system further includes time stamp tracking software configured to enable revisions to elements of the database by establishing time stamps for each stored element changed at a specified time and an assembler configured to enable a user to assemble elements for execution based on time stamping.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures:

FIG. 8 shows an example of the time-stamping mechanism and invocation of the runtime utility to compile content;

Figure 1:
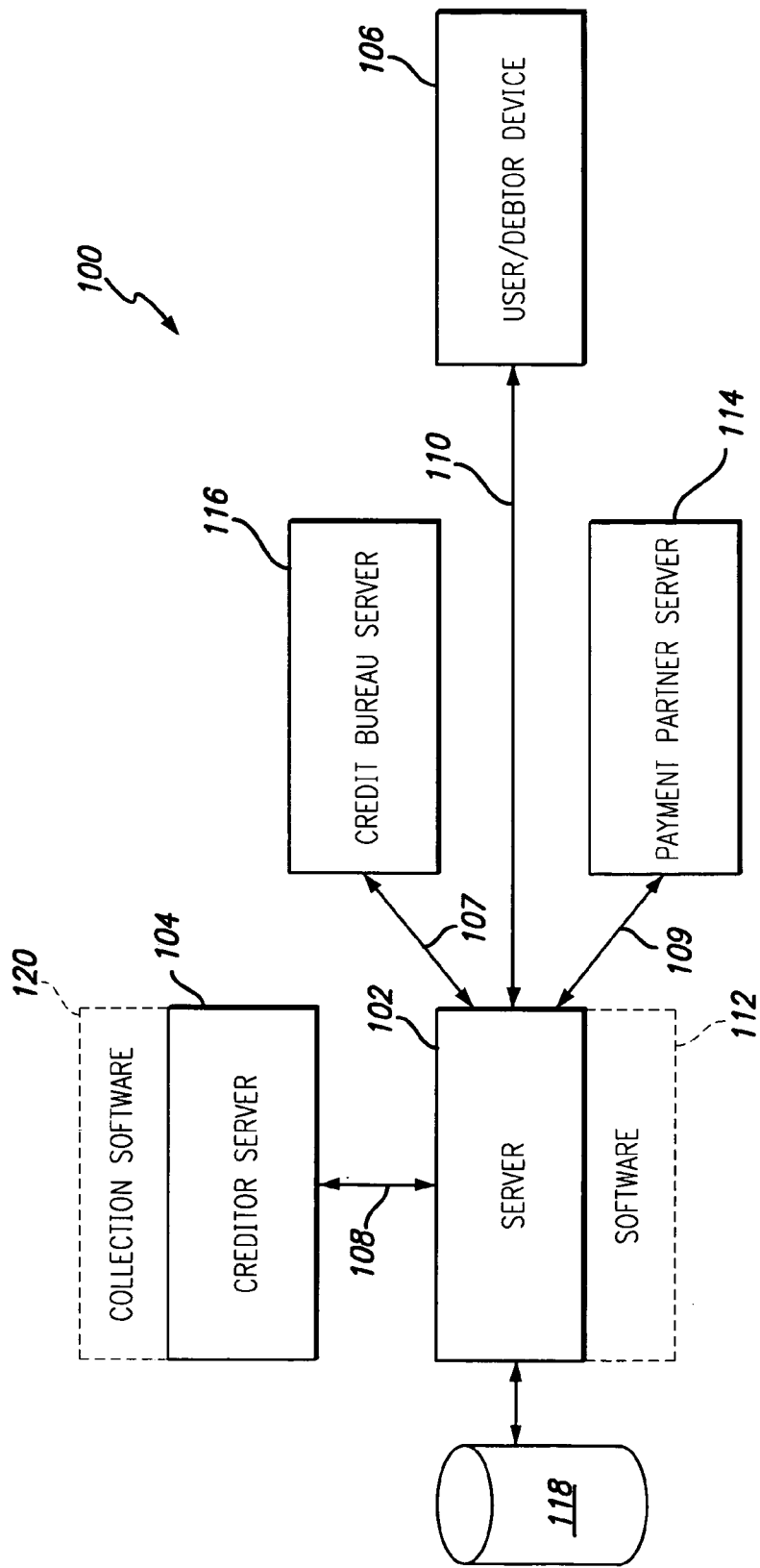
FIG. 1 illustrates a computer system for use in accordance with one embodiment of the present design.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present design comprises a software application applicable in methods and devices employed in resolving transactions. Resolving transactions may include, but are not limited to, resolving debts, resolving insurance settlement claims, establishing charitable donations, and the like. In this arrangement, the present design may enable an automated information collection system that presents certain offers of settlement to an individual based on certain information collected. The automated information collection system collects information about one party and parses and/or operates on the information collected based on a set of rules established by the other party, forming a transaction settlement offer set typically containing multiple offers.

The offers and information are typically provided via a computer network, such as over the Internet, typically via an encrypted connection. The individual may then elect one of the options presented or may refuse, whereupon certain additional information may be solicited and/or entered and the transaction moved further toward resolution. Even in instances where the transaction is not resolved using the present design, the information received can be useful in determining the ability and willingness of both parties to resolve the transaction and can indicate the next logical steps to resolving the transaction, such as initiating litigation or refraining from resolving the transaction altogether. The present design thus facilitates the overall transaction resolution process, reducing costs, time, and complexities associated therewith at terms acceptable to the parties to the transaction.

The transaction resolution design brings the two parties together with the ability for one party to employ a set of rules in a rules based engine to form an offer set to resolve the transaction. The present design thus automates resolution of the transaction using information externally obtained regarding the transaction and/or user in a rules based engine having rules provided in part based on desired negotiation rules for one party.

The present design facilitates operation of a transaction resolution system using meta-object time stamping, described below at an architectural level and a logical level.

While primarily described herein with respect to an exemplary system and method for resolving transactions in a debt settlement scenario, the invention and disclosure herein are not intended to be so limited. As noted, the present design meta-object time stamping system and underlying workflow model may be employed in a variety of application development and distribution scenarios, further including but not limited to information technology implementations, computational processing designs, and various software application development activities.

System

An architectural overview of an exemplary transaction resolution system employing meta-object time stamping functionality is illustrated in FIG. 1. From FIG. 1, a computer system 100 includes a server 102 used generally for transaction resolution. Server 102 may be in communication over a communication network 110 with a debtor device 106 such as, for example, a personal computer or PDA. Creditor server 104, operated for or on behalf of a creditor (e.g., a creditor of a debtor operating debtor device 106) may be connected by a communication network 108 to server 102. Collection software 120, which may employ existing software used by a creditor, runs on creditor server 104. Credit bureau server 116 communicates with server 102 over communications network 107. Payment partner server 114 communicates with server 102 over communications network 109.

Communication networks 107, 108, 109 and 110 may be, for example, the Internet or a local or wide area network. An application program, for example an Internet browser or another application to provide a graphical or other user interface to a debtor, may run on debtor device 106 and provide access by the debtor to server 102. A debtor account on server 102 may be activated or accessed, for example, using logon information provided by the debtor.

Server 102 may execute software 112, described in more detail below. Information regarding debtors, for example associated with debts held by the creditor operating creditor server 104, may be stored in account/transaction database 118 accessible by server 102. Note that other information may be obtained by the server either from internal or external sources to facilitate the transaction and to enable application of the rules described below with respect to software 112 to the data received in order to present the user with an offer set.

Software 112 may interact with collection software 120 so that debtor-related data is synchronized between server 102 and creditor server 104, such as in a real-time or secure batch process.

In general, the system illustrated in FIG. 1 operates to get the debtor and creditor or creditor representative/agent together to process the transaction, typically by offering a certain number of options to the debtor based on rules established by the creditor, wherein the information provided by the creditor may be parsed and processed to establish the options made available to the debtor. Server 102 may hold or have access to certain information but may functionally operate to hold information, collect information, and manage contact between the debtor operating debtor device 106 and creditor server 104, credit bureau server 116, and payment server 114.

Figure 2:
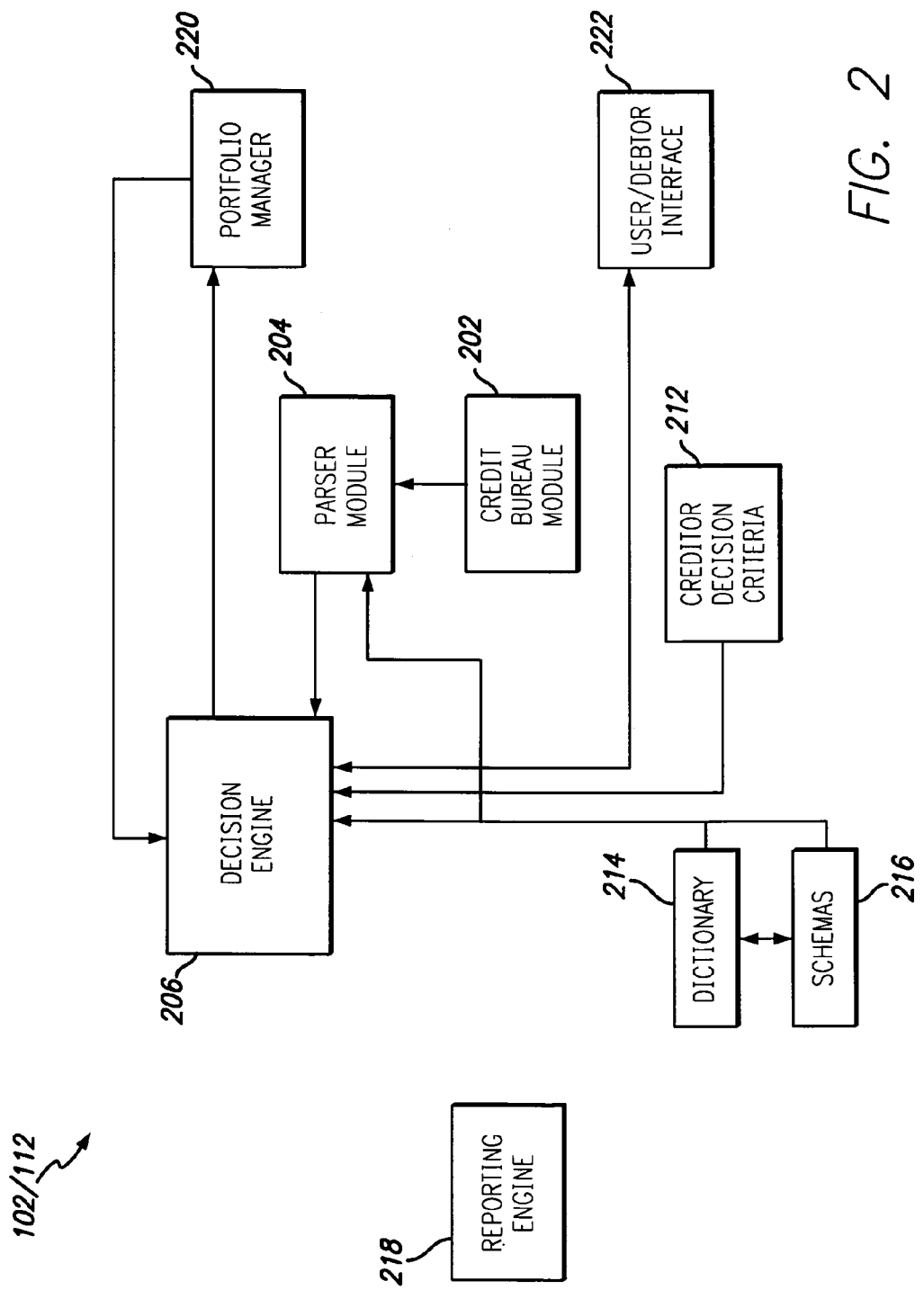
FIG. 2 is a logical representation of software modules executed by the server of FIG. 1.

FIG. 2 illustrates the logical arrangement of software modules that may be executed by server 102 as part of software 112. User/Debtor interface 222 may provide an interface to debtors using debtor device 106 and provide information provided from such debtors to decision engine 206. Credit bureau module 202 may obtain credit reports from credit reporting bureaus for the debtor currently accessing server 102.

Simply put, credit bureau module 202 receives a request, typically from decision engine 206, to obtain a credit report from credit bureau 'A'. Credit bureau module 202 then obtains the credit report from credit bureau server 116, shown in FIG. 1, for credit bureau 'A'. Credit bureau module 202 may perform some level of functionality on the credit report received, such as converting the report into a format usable by parser module 204 or locating certain limited information.

In general, however, the parser module takes the information received in the form of a credit report and parses the information into useful information to the system, and discards any unnecessary information.

The system may parse information based on the rules generated for the particular creditor or credit agency. Thus the system parses information based on the report provided in combination with the rules established by either the creditor/ credit agency or optionally by the party maintaining software 112. Rules for individual creditors may form part of schemas 216 and/or dictionary 214 and thus may be available to the parser module, either via the decision engine 206 or independent of the decision engine.

The result from parser module 204 is a set of information parsed from a particular credit report for a particular entity that may include only that information pertinent to a particular creditor or credit agency.

In other words, parser module 204 may parse information from a credit report for processing and decision-making by decision engine 206. More specifically, parser module 204 may extract and calculate user or creditor/credit agency defined credit report items and current account data, and then submit both the calculated bureau and account data to decision engine 206 for decision-making processing.

Decision engine 206 may compute, calculate and generate multiple settlement offers for the debtor based on information received from the individual's credit report, including, for example, the debtor's ability to pay and the debtor's bank and credit card account history. This history may be determined, for example, by accessing account/transaction database 118 using decision engine 206. Account/transaction database 118 may contain information about particular debtors either acquired by means independent of those modules shown in FIG. 1, or from the modules provided such as credit bureau server 116, payment partner server 114, or from the debtor via debtor device 106.

User/Debtor interface 222 may also assist in providing this history data to decision engine 206 by accessing account/transaction database 118. User/Debtor interface 222 serves two functions: providing an interface to the debtor directly, such as during an online session, and possibly accessing the debtor account database where appropriate.

If decision engine 206 has available parsed credit report information, either upon authentication of the user/debtor or after the user/debtor has reconnected via debtor interface to the system, the decision engine may obtain schemas, rules, and a dictionary appropriate for the creditor/credit agency or other entity seeking resolution of the debt transaction. Decision engine 206 relies on dictionary 214 and schemas 216 in presenting the set of options or decisions to the user/debtor. In this context, a schema is a structured framework of rules appropriate to the situation. In one embodiment of the present meta-object time stamping design, the operator of server 102 may desire to afford two or more strategies to be executed in parallel. For example, where the first strategy is based on one set of goals and the second strategy is based on a different set of goals. Each goal may be represented using different rules for establishing an offer set. The different rules may be applied by using a first dictionary to compile software code for operating an application instance reflecting the goals of the first strategy and a second dictionary to compile software code for operating a separate application instance reflecting the application of goals for the second strategy.

Decision engine 206 is therefore typically a rules-based engine that uses rules previously defined, for example, by the administrator of server 102 or another entity having a business or other relationship to server 102. The rules used by decision engine 206 may therefore also include information defined by creditors in creditor decision criteria 212, and decision engine 206 may be interactive, meaning that persons external to the decision engine may provide information that may be used to present offers via user/debtor interface 222.

Thus the overall functionality of decision engine is to interact with the debtor via debtor interface 222, and once the debtor is authenticated, obtain the parsed credit information for the user and any information about the debtor from account/transaction database 118. Based on the specific debt owed, the decision engine uses dictionary 214, schemas 216, and creditor decision criteria 212 to prepare a set of offers to the debtor, the set including at least one offer. The offers are then conveyed to the user via the debtor interface 222 and the debtor may select one for resolution of the transaction.

Dictionary 214 generally represents a translator of terms employed within the credit report, schemas, and creditor decision criteria. In general, the decision engine may obtain rules and schemas, from for example creditor decision criteria 212 and/or schemas 216, credit reports from parser module 204, and credit bureau module 202, and may translate them into a format usable by decision engine 206.

Schemas 216 may be used to import source data, for example, provided from creditor server 104, to server 102 as illustrated in FIG. 1.

Dictionaries may be produced or augmented using client specific schemas, where dictionaries are used to translate information from one form or version to another. Schemas may be analyzed and depending on the terms, terminology, formats, and aspects employed in the schema, certain translations or conversions may be offered in the dictionary.

Dictionaries may include definitions (as mentioned above) that include, for example, both offer variables and guidelines, where guidelines may be offered as part of a dictionary 214, schemas 216, or creditor decision criteria 212 or other appropriate location in software 112 executing in server 102. Guidelines may be defined requirements that a debtor's profile must meet in order for a certain offer or set of offers to be made. Offer variables may be functions used to generate offers based on, for example, predefined mathematical functions.

Creditor decision criteria 212 represents information (e.g., stored in memory accessible by server 102) that may be used by decision engine 206 in generating settlement offers. Creditor decision criteria 212 may be information previously provided by one or more creditors each independently accessing server 102 using its own creditor server 104. Creditor decision criteria 212 may be stored as a set of rules that decision engine 206 follows in generating offers.

Reporting engine 218 collects information regarding the debt, the actions of the debtor, the offers made, the offer accepted, the payment made and any payments to be made in the future, and other relevant information computed within the system and provided by the system and can compile the information as desired in a report format, such as in a spreadsheet or other document form.

Portfolio manager 220 may provide debt balance management and the migration and/or sales of debt portfolios to other entities as dictated by rules maintained on system 100. The functions of portfolio manager 220 therefore may be based on rules including information from creditor decision criteria 212. Thus rules are used to manage the portfolio using portfolio manager 220.

Standard SDLC Methodology

In general, the software industry follows a standard SDLC methodology, and associated workflow model, that have been incrementally modified and improved over time, mainly to accommodate evolutionary changes in hardware and software technologies. For purposes of this disclosure the standard SDLC methodology, representing today's current best practices, will be described.

Figure 3:
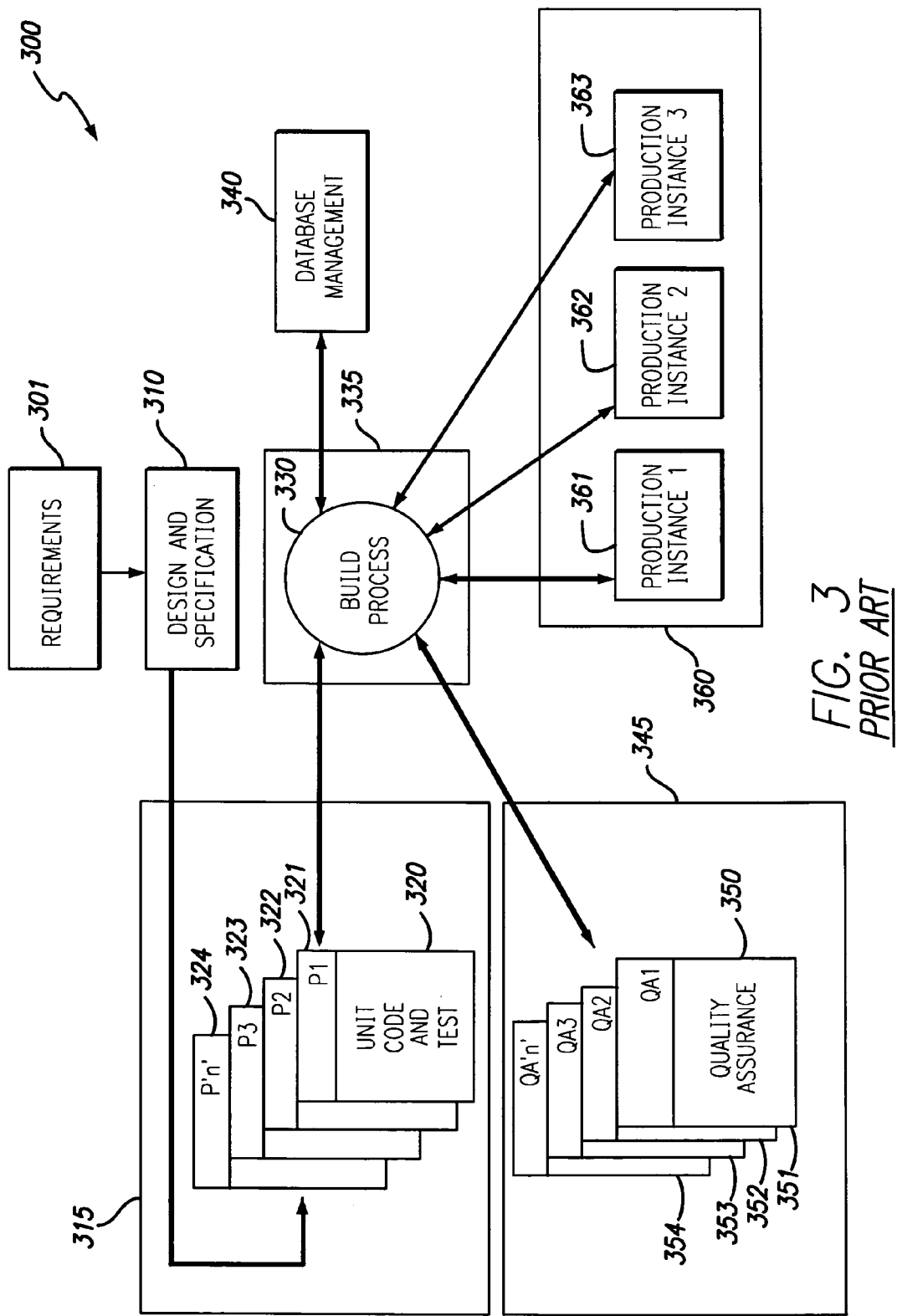
FIG. 3 illustrates a standard logical workflow model.

The standard SDLC methodology begins with collecting requirements and continues through release of software into productive use, or production, where end user may access and use the services provided by the deployed application. FIG. 3 illustrates the standard SDLC methodology 300 as a logical workflow model.

The disclosed logical workflow model establishes product requirements, e.g. software application requirements, at point 301. Such requirements are typically collected from a variety of resources. For example, requirements may originate from sources including customer requirements, research and development, standards, competitive analysis, integration partners, and so forth. The collected requirements are filtered to produce a 'formalized' set of product requirements sufficient to be distilled into a product design and specification at 310. The design and specification realized from interpreting the formal requirements may be further broken down ultimately representing unit code and test development efforts 320. Each unit code and test development effort 320 may be assigned and performed by an individual programmer, shown as P1 at point 321, P2 at point 322, P3 at point 323, and P'n' at point 324. The programming efforts are performed within a separate hardware environment illustrated at point 315.

To realize unit code and test development efforts 320, the workflow model 300 is shown in the form of multiple programmers operating individual computing devices, such as a personal computer. Each personal computer provides a hardware environment sufficient for executing a local application instance and for executing third party development libraries and tools for use by the programmer. In order to create the desired software application, each programmer may be required to have expertise and experience with the use of a wide range of third party development tools, such as provided within software development kits (SDKs). Examples of third party tools may include third and fourth generation language tools, application programming interfaces (APIs), debuggers, graphical user interface design tools, parsers, source code control software, Internet development tools (i.e. web), and wireless development tools. In summary, a copy of these tools is typically installed at each programmer's personal computer resource sufficient for supporting their unit code and test development efforts 320.

To realize quality assurance development activities and efforts 350, multiple testers are assigned individual computer resources at various quality assurance functions and positions. Each quality assurance development effort 350 may be assigned and performed by an individual tester, shown as QA1 at point 351, QA2 at point 352, QA3 at point 353, and QA'n' at point 354. Each individual's personal computer resource provides hardware sufficient for executing a local application instance as well as third party automated test suites and tools usable by the testers. In summary, a copy of the test tool environment is installed at individual's computer sufficient for supporting their quality assurance software development 350 functional contributions within a separate second hardware environment illustrated at point 345.

In addition to unit code and test development 320 and quality assurance development 350 environments, a distinct and separate production operations environment 360 may be required or supported. For example, production instance 1 at 361 may provide for a beta and focus group users associated with sales and marketing demonstration environment, where production instance 2 at point 362 may provide for an "in-productive-use" service provider environment for access by user/debtors. Production instance 3 may provide for an alternate "in-productive-use" service provider environment. Production instance 2 and production instance 3 may be realized from compiling the product or software application using different and separate dictionaries, schemas and creditor decision criteria. For example strategy one may execute from production instance 2 using dictionary 1, schema 1 and creditor decision criteria 1 when compiling production instance 2. Similarly, strategy two may execute from production instance 3 using dictionary 2, schema 2 and creditor decision criteria 2 when compiling production instance 3. In this example, operations environment 360 provides three separate hardware environments. Each hardware environment may execute a single version of the application for production instance 1, production instance 2, and production instance 3.

To complete the workflow model, Database Management 340 in FIG. 3 provides for separation of data from code. System data architects and managers typically access the database management module in order to change database content. Changes are made to existing schemas, and changes are stored in the dictionary. Further, the database management may include using a database management system that controls and promotes database changes into the build process at point 330.

Simply put, the build process at 330 required for supporting unit code and test 320, quality assurance 350, and production operational environment 360 must allow for version control. Version control ensures that the software release level available for use by the programmers may be at a later release level than the software version release level provided to the quality assurance organization. In this way, programmers may work with a version of the code being developed that includes the most recent features in a less stable environment, resulting in more unidentified defects. Testers may work with a version of the code that has fewer features in a more stable environment while the production instance exhibits lower functionality. In a similar manner, build process software control management maintains additional version release levels in support of production environments as well as the ability to roll back a release from production.

In order to realize the workflow shown in FIG. 3, the software development environment requires use of multiple separate hardware and software environments, including code support, quality, and production activity. Each activity requires multiple development application instances, each executing on a separate hardware resource, such as a workstation, personal computer, or other hardware resource sufficient to support multiple individuals within multiple teams construction workflow approach.

Figure 4:
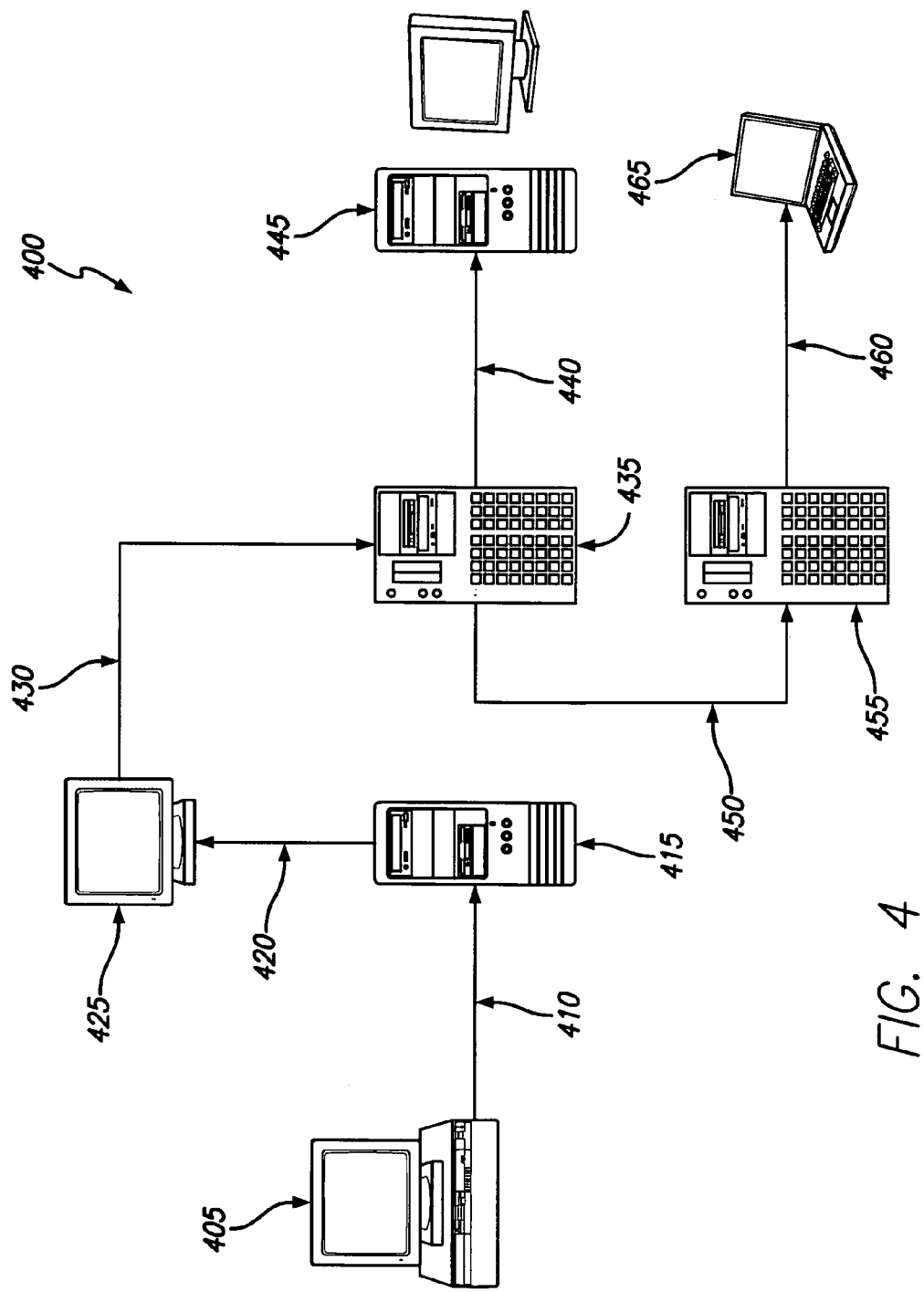
FIG. 4 illustrates a standard functional workflow model.

FIG. 4 illustrates a functional workflow model for standard methodology 300. The functional workflow model 400 begins with a programmer performing unit code and test activities at developer workstation 405 by operating and maintaining a local application instance on each developer workstation. Although only one developer workstation 405 is illustrated in FIG. 4, the functional workflow supports a multiple developer environment. At various development stages, such as features and schedule, programmers may submit code via code check-in procedure 410 and code may be provided to source code repository 415 operating an external version control system and providing software control build labels. In this workflow, the system provides newly submitted application binaries to build server 425 via code check-out procedure 420 and initiates version control functionality. Build server 425 may be operated to build and deploy newly submitted application binaries for execution on quality assurance server 435 via quality assurance promotion path 430.

A tester may operate tester workstation 445 and perform quality assurance activities 350 by accessing server 435 for purposes of evaluating the latest software build via quality assurance testing path 440. Although only one tester workstation 445 is illustrated in FIG. 4, the functional workflow may support a multiple tester environment. On successful completion of quality assurance 350 activities, the tested binaries executing in quality assurance server 435 may be promoted, or deployed, to production via production deployment path 450 for execution in production server 455.

Customers operating end user device 465 may access the production server via customer access path 460 to receive value by interacting with the application instance executing within production server 455.

Following the workflow model of FIG. 4, application providers purchase and deploy multiple hardware 'server' environments, e.g. programmers, source code repository, build and deployment functions, quality assurance, and production instances. Each hardware environment is configured to replicate the software development environments such that the various development activities are separately maintained. Further, each application instance executing in each of the workstations and servers supporting the various application environments may be realize using different software, or code, configurations. Multiple differing code release levels are simultaneously supported by different hardware servers.

In summary, when following the current workflow model, enterprise application development dictates that a separate hardware environment be established to support coding, quality assurance, and production. This is due in part to the limitation that only one configuration of the application may execute in the same instance. In order to field concurrent execution of different application configurations, physically separate resources are required because binary code is being modified along the functional workflow path.

In short, prior designs are limited in that they require multiple and separate individual hardware environments, one for each release level, version, and so forth. To include a new function, or other software change/modification, the previous design becomes problematic as it requires the re-compilation of the entire source code to add the new function to an existing software system application version such that the new version can be employed by different programmers, a result that is cumbersome and difficult to efficiently implement. Code changes in this environment are slow and painstaking.

Meta-Object/Metadata Workflow Model

Note that while certain examples are provided here and throughout this document, these examples are meant to be illustrative and not limiting as to the functionality of the present system and method. Other examples and implementations are possible and this document should not be limited by the examples presented.

The present design for developing and distributing software is disclosed as being part of software 112 executing in server 102 (shown in FIG. 1), for example within or in conjunction with decision engine 206 software module illustrated in FIG. 2.

The present design provides an efficient design for replacing objects with code where the code, i.e. object definitions, is stored in an RDBMS (relational database management system). The present design provides a flexible dynamic way of creating objects using meta-data and compiling application instances including this meta-data.

The meta-object system (MOS) provides a software environment where development and distribution activities may be accomplished in a single live instance of the software application affording an efficient, real-time self-deploying production facility. The present design is configured to execute and maintain multiple different MOS software application configurations for concurrent execution using the runtime utility as shown in FIG. 5. The runtime utility may operate as an interpreter configured to examine time stamps during compilation. In this arrangement, the present design may invoke the MOS built in compiler to recompile only a partial set of software components for a complete enterprise software application, where the interpreter arrangement is configured to go through each fix code and content item modification to build a new instance of the software application using the most recent code elements based on time stamps.

Meta-objects require a runtime utility, or engine, as well as a caller or host application. The runtime engine provides necessary mechanisms for interfacing the meta-object execution space with the host application Also, runtime classes can provide specialized processing for meta-objects such as data-driven parsers, where members include parsing rules and calculations referencing the parsed values, and data-driven message processors. Meta-object based implementations may be updated without the need for deploying new binaries, as is the usual case in static-class implementations.

The present design may be realized using different computer resources, including but not limited to hardware, software "code," firmware, and use of these resources in combinations thereof. The software "code" embodiment disclosed may provide for a suitable and sufficient development, test, and production environment in accordance with an aspect of the present design. The meta-object system design may provide for an executable software environment where development and distribution activities may be accomplished in a single live instance of meta-object system 500 illustrated in FIG. 5A.

The present design's meta-object implementation model may be configured to store object specifications in a relational database. The meta-object system is composed of data that describes a set of objects, plus a runtime module or section that can execute that metadata.

The meta-object system arrangement may include a relational database server, a time-stamping mechanism, and a runtime utility. In this arrangement, meta-objects 510, such as object specifications shown as a row of meta-object content items in a first column A, may be stored in relational database management system (RDBMS) 520. The meta-objects may involve and be represented by a fixed object hierarchy where specific behaviors and properties are described by these specialized objects. Thus, the present design may afford a substitute mechanism for replacing fields within the source code with embedded literal values, processes, or applications required for implementation. In addition, time-stamping mechanism 530 may generate and apply a time marking attribute for each stored meta-object. The time mark attribute may associate a time mark 535, shown as a row of time mark data base content items in a second column, for each meta-object in RDBMS 520.

Meta-object system 500 may involve a relational database server 537 configured to store meta-objects with individual unique time stamps, meta-data associated with each meta-object, and other information as defined by and specified in schemas 540 stored in dictionary 550. The meta-objects 510 or object specifications content may be stored by relational database server 537 in the form of a name field and a formula field for providing a literal value or executable script, or meta-data. Meta-data in this situation may involve text, voice, images, and/or other appropriate data. The present design may store one or more schemas in the RDBMS defining the tables, fields, procedures, indexes, functions, queries, triggers and data base links associated with a version of the enterprise application.

In this arrangement, the present design's meta-object system time stamping mechanism may enable the automated tracking of each meta-object's level revision, such as additions, deletions, and modifications to meta-data 555 associated with the tracked meta-object. Meta-data, or data stored within RDBMS 520, may be organized in accordance with schemas 540. Schemas 540 may provide for the distillation of the meta-objects and the meta-data, for example, by defining the tables, fields, procedures, indexes, functions, queues, triggers, and links as information for classifying and finding time-stamped data. The present design may use schemas stored in dictionary 550.

Figure 5A:
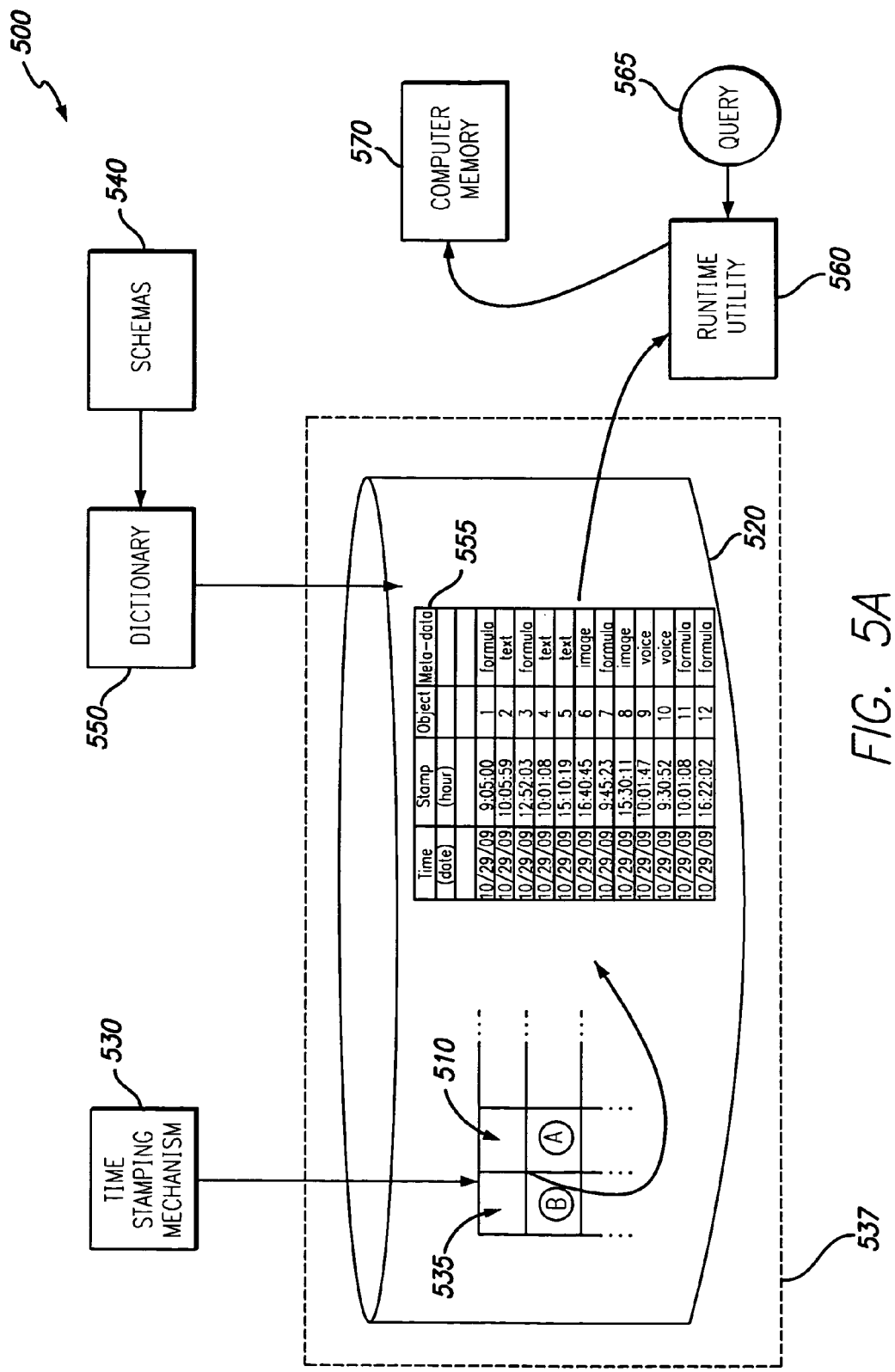
FIG. 5A shows the meta-object system relational database server, a time-stamping mechanism, and a runtime utility arrangement configured for retrieving and executing metadata.

FIG. 5A illustrates runtime utility 560 configured for retrieving and executing stored metadata. The runtime utility method may assemble meta-object instances based on results from a database query at point 565, written in a language such as Structured Query Language (SQL), and may write the query results, such as one or more member rows, into computer memory at 570 for execution. The meta-object member rows are analogous to a method call or property, with a name field providing the method or property calling signature and a formula field providing a literal value or executable script. Once read into memory, meta-objects may be executed on demand. Objects may be instantiated by Class and/or Object identifier.

Use of meta-objects in this manner removes the constraint that identity and relationships are specified as source code. Instead, relational database modeling may be used to specify a general structure and set of relationships. The realized runtime instance can vary based on database updates, queries and query parameters. This arrangement lends itself to the design of dynamic, rule-based systems for workflow, decision and machine-learning applications, and promotes the use of generic lists and list-driven processes for business logic.

Meta-objects further provide an object member order. Traditional objects do not consider member order, but meta-object members may have an explicit execution order. Thus, data processing, parsing and other ordered operations may be built into the meta-object at the database layer.

Runtime utility 560 may provide for an efficient real-time self-deploying production facility where on demand compilation is realized. The runtime utility may interface the meta-object execution space with the host software application environment without the need to deploy new binary objects.

The system may assemble meta-object instances as a result of the data base query. The query results may return one or more member rows with a named field providing the method or property, represented by the metadata retrieved, and a formula field for providing a literal value or executable script. The system is dynamic in the sense of specifying identities and relationships in objects stored in the database. Content items are varied as well as queries and query parameters to realize a specific runtime instance of the software application.

Within meta-object system 500, the runtime utility of FIG. 5A may orchestrate compilation of multiple meta-object instances, where each runtime instance may reflect one or more changes to the application code. Realizing changes to the application code typically involves inputting updates to modify the current contents of relational database server 537 and time-stamping each update using time mark 535.

Differing meta-object instances may be executed by runtime utility 560, where each instance may be constructed using one or more variable data base queries 565, where each database query involves varying the specified query parameters submitted to the runtime utility.

FIG. 5A illustrates an example class diagram representation for an entity relationship model involving time stamping mechanism 530 with time mark attributes 535. In this example diagram, MetaClass 580 is shown to have a parent-child class relationship to MetaObject 585. Upon creation of MetaClass 580, the present design may provide for a CreationStamp 581 and subsequently an UpdateStamp 582 where each time stamp may include present data and time sufficient for tracking purposes. The relationship between MetaClass 580 and MetaObject 585 is shown as a "one-to-many" relationship at line 583. In a similar manner, the meta-object system may provide a time stamp for each subordinate class shown as CreationStamp 586 and UpdateStamp 587. Continuing on, MetaObject 585 may have a parent-child or subclass namely MetaMember 590. MetaObject 585 is shown to have a "one-to-many" class relationship to MetaMember 590 at line 588. The meta-object system may provide a time stamp for each MetaMember subclass, such as CreationStamp 591 and UpdateStamp 592. Time stamping mechanism 530 may track MetaMemberType 595 by assigning a CreationStamp 596 and an UpdateStamp 597, and so forth. In summary, the present design system and method may provide a time mark attribute for each class defined for the software application being constructed and/or modified.

The meta-objects may involve use of an object member order, or execution order. The present method may provide data processing, parsing, and other ordered operations as functions built into the meta-object at the database layer. In short, the present design stores the objects specifications, i.e. definitions, in the database using the time stamping operation discussed herein.

Figure 5B:
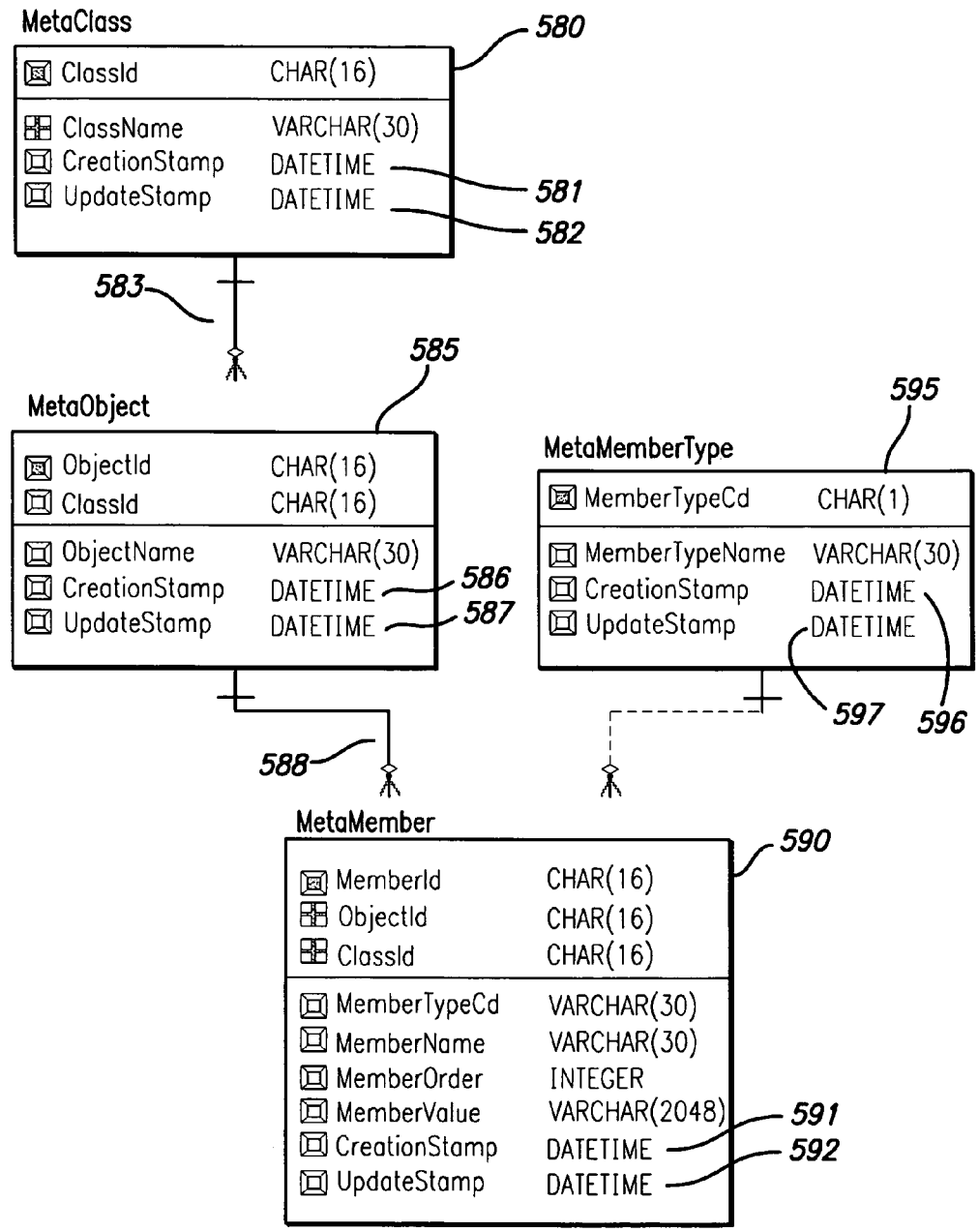
FIG. 5B illustrates an example class diagram representation for a schema involving a time stamping mechanism with time mark attributes.

A meta-object system does not have to use the model shown in FIG. 5B. A system can provide almost any set of related tables with meta-object behaviors by the addition of, for example, text columns to store script source and the right runtime engine.

Figure 6:
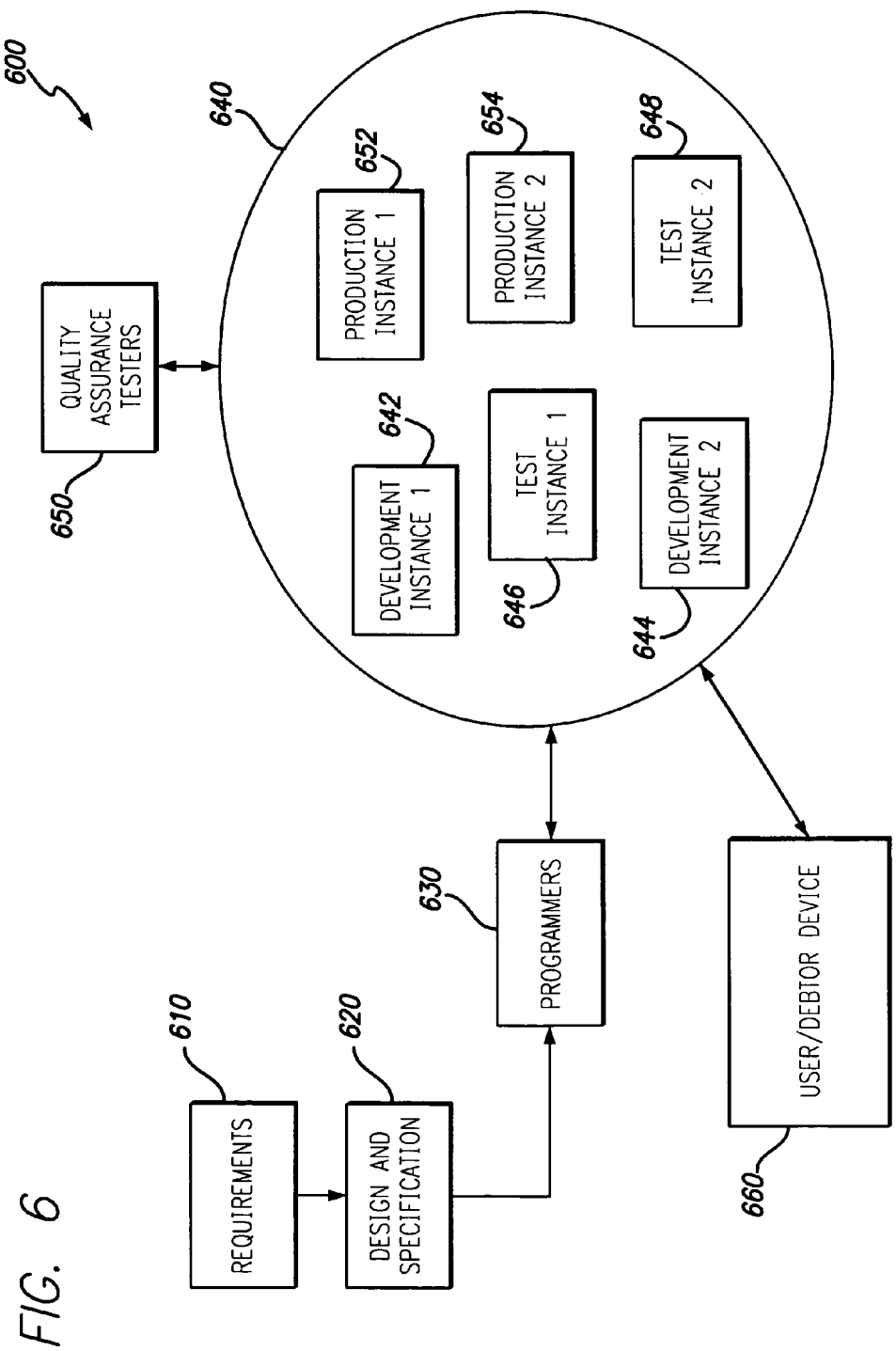
FIG. 6 is a meta-object system logical workflow model.

FIG. 6 illustrates a meta-object system logical workflow model 600 beginning with establishing product requirements at point 610, collected from a variety of resources. Requirements may originate from the same multiple sources described previously for the standard methodology 300 as shown in FIG. 3. Further, a design and specification 620 may be generated in a similar manner to that previously disclosed for the standard workflow model.

The design and specification 620 may be distributed to one or more programmers 630 for implementing the desired features and functions represented in the specification. Programmers accessing meta-object system 640 are directed to the appropriate application instance executing within the meta-object system at logon. For example, the present design may provide access for a first, second, and third programmer assigned to work on a first application to development instance 1 at point 642. In a similar manner, the system may provide access for a fourth and fifth programmer assigned to work on a second application to development instance 2 at point 644.

Each programmer accessing the meta-object system may access and execute the latest available set of development libraries and tools. In this manner, the design may afford the entire development team access to the latest tools necessary to build software applications. The present design may provide for centralized maintenance and update for each development and production instance deployed.

Quality assurance testers 650 accessing meta-object system 640 are directed to their appropriate application instance executing within the meta-object system at logon. For example, the present design may provide access for a first, second, and third tester assigned to work on the first application to test instance 1 at point 646. In a similar manner, the system may provide access for a fourth and fifth tester assigned to work on a second application to test instance 2 at point 648. Each quality assurance tester accessing the meta-object system may access and execute the same, latest sets of automated test suites and tools available.

The present design supports access by multiple programmers and multiple testers being assigned to a variety of different application development efforts, or release level versions.

In addition to programming and quality assurance development environments, the present design may provide for distinct and separate production instances. Each user 660 accessing the present design may be directed to a predetermined production instance. For example, beta and focus group users associated with sales and marketing demonstration environment may be directed to production instance 1 at point 652, where production instance 2 at point 654 may provide for an "in-use" service provider environment for access by users/debtors in resolving transactions.

Figure 7:
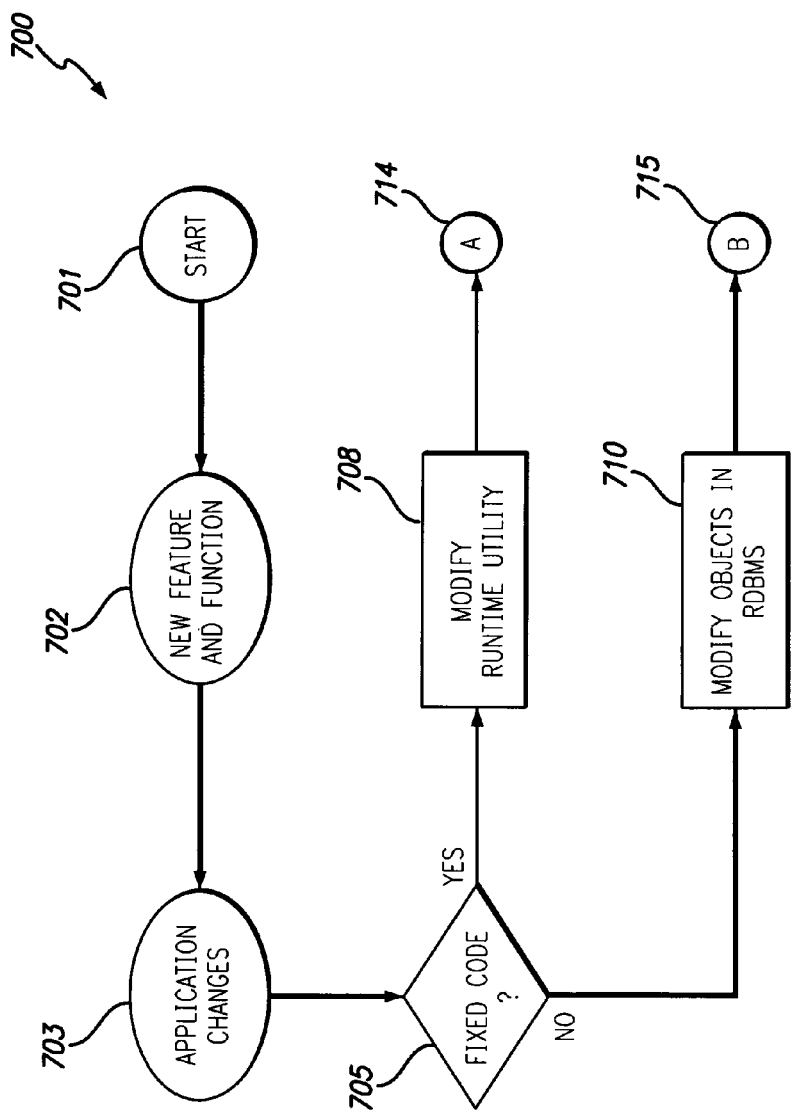
FIG. 7A shows a flowchart determining whether a modification to the meta-object system software application involves a modification to the runtime utility.
FIG. 7B illustrates a flowchart for making additions, modifications, and/or deletions for relational database server content.
Figure 7A:
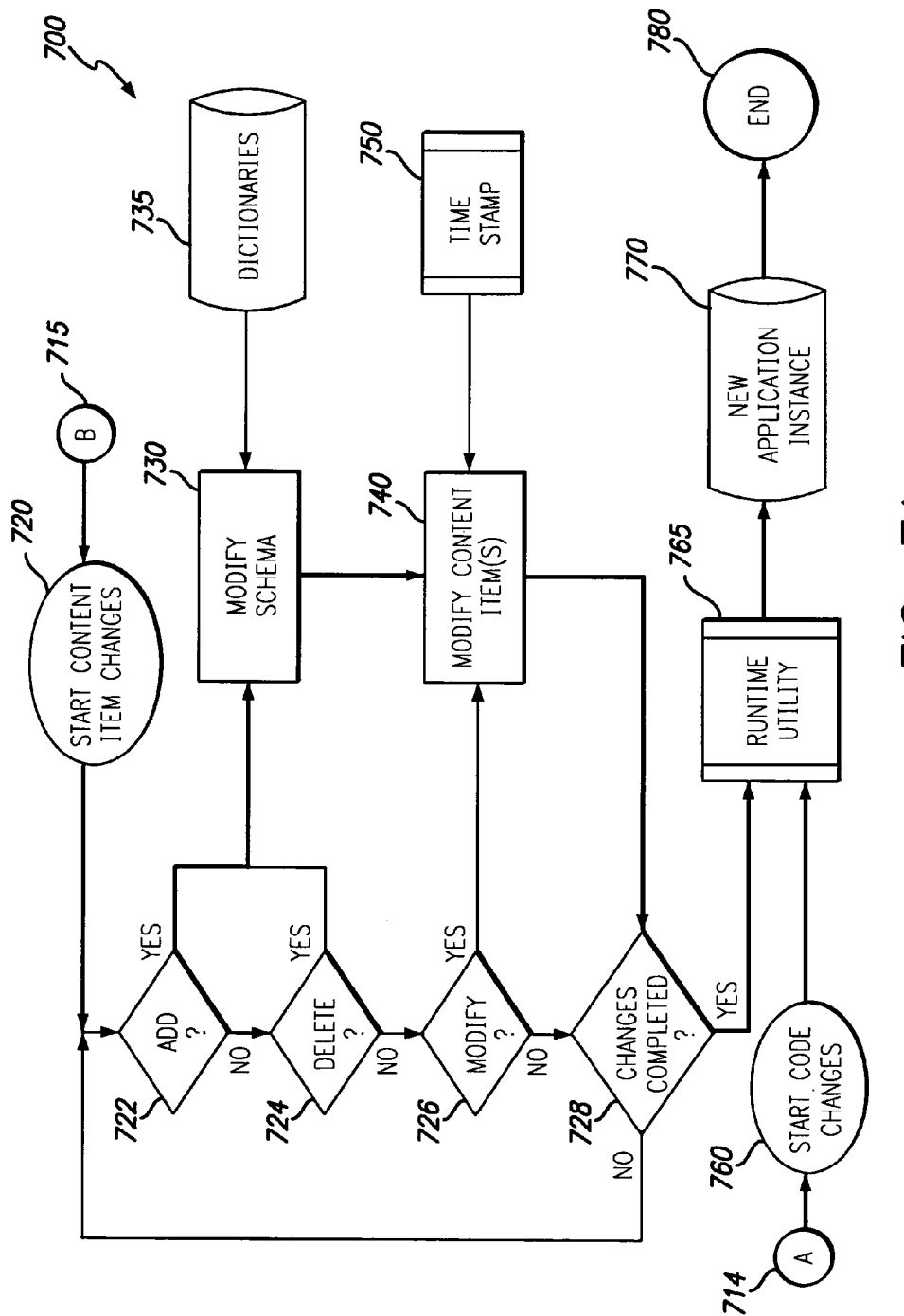

Creating and realizing each application instance is illustrated in FIGS. 7A and 7B. Various differing development and production instances may be realized by compiling the software application using different and separate dictionaries, schemas and/or creditor decision criteria. For example, strategy one may execute from production instance 1 by using dictionary 1, schema 1 and creditor decision criteria 1. Similarly, strategy two may execute from production instance 2 by using dictionary 2, schema 2 and creditor decision criteria 2.

The system may provide version control through the use of time stamped objects, schemas and dictionaries. In a similar manner, the system may maintain additional versions of previous release levels in support of production environments and the ability to roll back a release from production using the present design's time stamping mechanism.

FIG. 7A illustrates a flowchart for determining if a modification to the meta-object system software application involves a modification to the runtime utility and/or the meta-objects. The modification process starts at point 701. New features and functions 702 may be collected for incorporation into the software application. Developers may determine which portions of the design require application changes at point 703. Each application change involves either portions of the application that remains essentially fixed, i.e. with relatively few changes, and those portions that will tend to be variable, i.e. code that will be changed frequently.

The present method may filter each application change at point 703 to determine if the change is to fixed code at 705. If the code is determined as "fixed", the present design may direct developers, i.e. programmers responsible for implementing the function and feature, to modify runtime utility at 708. Software application changes regarding fixed portions of the code are positioned for further processing and implementation at point 'A' 714 in accordance with the meta-object system methodology as shown in FIG. 7B. If the code is "not fixed", i.e. variable or frequently changing, the present design may direct developers to modify objects in the RDBMS at point 710.

For example, in a Microsoft operating system development environment, the meta-object system runtime utility may involve a large number of dynamic-link libraries (DLLs) for an enterprise software application. These DLLs represent a generally recognized method for implementing shared libraries. In this example, to realize fixed code software application changes existing DLLs may be modified and/or new DLLs may be created. To implement and promote variable code software application changes, existing meta-objects may be modified and/or new meta-objects may be created. Software application changes regarding variable portions of the code are positioned for further processing and implementation at point 'B' 715 in accordance with the methodology shown in FIG. 7A.

FIG. 7B illustrates a flowchart for a programmer making additions, modifications, and/or deletions for changing the relational database server contents (shown in FIG. 5). Content changes may provide updates, corrections and improvements for currently deployed application code features and functions.

In order to change the contents, a programmer may access the relational database management system and locate the desired content item(s). The programmer may use the latest existing RDBMS tools to modify, such as edit, one or more the content items stored.

Code portions determined to be best suited for meta-object implementation, due to their inherent variability characteristics, are provided to point 'B' 715 as illustrated in FIG. 7B. The meta-object system may start content item changes at point 720 and filter the changes into one of three types: add at 722, delete at 724, and modify at 726. For example, if the code changes represent new functions and features, the programmer may choose to make additions in content items shown as an Add at point 722. Following the flowchart, to effect an Add software change, the programmer may access and modify the schema at point 730 and associated dictionaries at point 735 to identify, define, and describe the desired new content item(s). The programmer may populate the newly added content item(s), illustrated as modify content item(s) at 740, as defined, directed, and determined by the schema modifications. The meta-object system may time stamp at 750 each new and modified content item involved in the change effort.

In the situation where more changes to the application are required, the present method may loop back from completed changes at 728, returning to the Add block 722. If the code changes are complete, the present design may compile code changes using runtime utility 765. The runtime utility may accept 'fixed' code changes from start code changes at point 760 in conjunction with variable code changes from changes completed at point 728 and submitted to the runtime engine. The meta-object system runtime utility may involve an interpreter and compiler and may examine and consider the available meta-object time stamps in combination with the schemas to build the new application. The runtime utility may compile information from the database to add records and properties without having to recompile the entire application. Compiling the changes in this manner may provide for new features and functions within new application instance 770 when compiled into a live instance by the meta-object system. At this point, the application is available for release into a development or production environment and use, and the method concludes with end changes at point 780.

In a similar manner, if the code change situation dictates that the programmer needs to delete meta-objects at point 724 to implement the desired change, the present method may modify the schema at point 730 and modify the content items at point 740 to reflect the removal of existing content items from the RDBMS. In this manner, the design may effectively remove currently available application features and functionality.

The present design may also actively track object changes and may automatically recompile the application software based on these changes. In other words, the present design may generate objects that know when they need to be compiled.

FIG. 8 illustrates an example for meta-object data base content items involving the present design's time-stamping mechanism. In this example, the system's time stamping mechanism may provide a time stamp date at column 810 and a time at column 820, where a date and time, shown in hours, minutes, and seconds, is provided for each stored meta-object. An object tracking number, shown in the example as items 1-12 at column 830, defines each individual object stored and the associated meta-data, such as a formula, text, image, voice, or other data, is shown occupying column 840. A query may be entered to invoke the runtime utility for the compiling content items stored in the RDBMS. Such a query is illustrated in FIG. 5 at point 565, indicating the desired range for creation and/or update time stamps desired for compilation. Query (1) at column 850 seeks to compile an application instance containing all time stamped objects with a creation stamp prior to 10:05:00 on Oct. 29, 2009, and items satisfying this query 1 are shown as content items 1 (CL1) at 855. Such a query may be provided when attempting to revert to a state in existence at 10:05:00 on Oct. 29, 2009. The query results are shown in column 850. A second query, Query (2) at column 860, seeks to compile an application instance containing all time stamped objects as of the current time, which includes content items 2 (CL2) at 865. Such a query may seek the most currently available information, where the current time is 0:00:00 on Oct. 30, 2009. Query (3) at column 870 seeks to compile an application instance containing all time stamped objects stamped later than 10:05:01 on Oct. 29, 2009 as content items 3 (CL3) at 875. Such a query may be employed to evaluate the more recent code changes, for example.

As noted, in the example of FIG. 8, query (1) seeks the most stable version, i.e. oldest components, of the application software. Query (2) may represent all the content items currently in development. Query (3) may be used by developers in constructing new features and functions.

Upon receiving the query results, the meta-object system may invoke the runtime utility and may interpret and compile the content items, e.g. objects, with the fixed source code changes into a new application instance. In the situation where only objects have changed, and the runtime utility software environment is unchanged, the system does not need to recompile the entire application, and only the selected, appropriately time-stamped information stored within the RDBMS need be considered and processed. In this arrangement, the system may enable addition of new features and functionality to a software application in the form of an updated instance without having to download the new update to the user's environment or computing device.

The system may ensure that the software release level available for use by the programmers may be later than the software version release level provided to the quality assurance organization. In this way, programmers may work with a version of the code being developed that includes the most recent features in a less stable environment, where potentially more or unidentified defects are present. Testers may work with a version of the code that has fewer features in a more stable environment while the production instance exhibits a lesser amount of functionality than the quality assurance instance with greater stability.

The meta-object system may involve one or more sets of related tables exhibiting meta-object behaviors. Use of meta-objects may enable customer-specific variations in desired behavior to be specified in the metadata, thus eliminating the need for custom programming resulting in new binaries for deployment.

Figure 9:
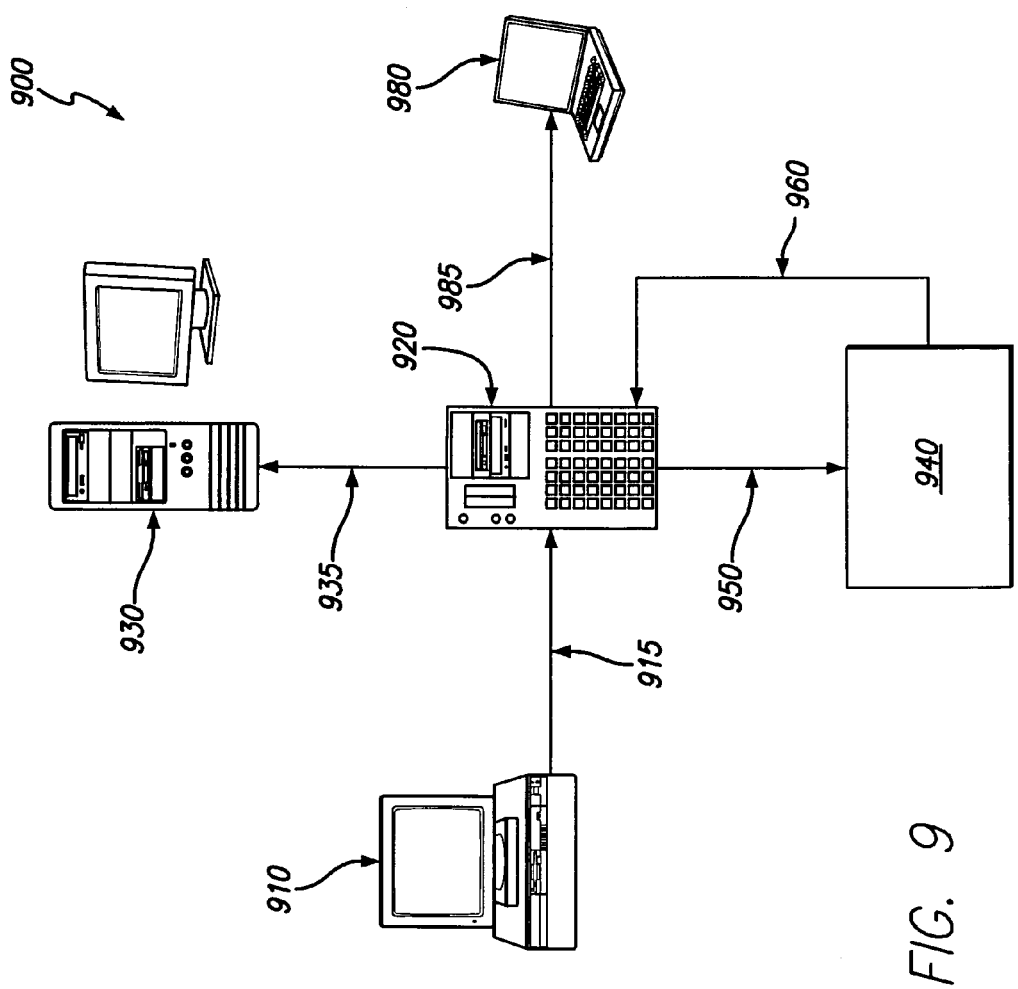
FIG. 9 is a functional workflow model for the meta-object system.

FIG. 9 illustrates a functional workflow model 900 for meta-object system 500 configured to execute a single "in effect" operation instance of the software application in production server 920. Production server 920 executes multiple labeled meta-object configurations, where the label includes a time stamp, using the meta-object runtime software environment 940 arrangement within production server 920. Runtime software environment 940 may make available concurrent user access. Programmers at configuration engine 910 may have access to runtime software environment 940 via path 915, testers at tester workstation 930 via path 935, and a plurality of customers/users at end user workstation 980 via path 985. Concurrent user access may include one or more different labeled meta-object configurations being executed within the runtime environment. Customers operating end user device 980 may access the production server via customer access path 985 and interact with the application instance executing within production server 920.

Access to a single instance of the meta-object system may provide the facilities and functionality for a programmer responsible for performing unit code and test activities at configuration workstation engine 910, for example for use as a developer workstation. In this arrangement, the present design may operate and maintaining a single meta-object runtime software environment meta-object system application instance executing in production server 920. Although only one configuration workstation engine 910 is illustrated in FIG. 9, the functional workflow model may support a multiple developer environment in accordance with an aspect of the present design. In this workflow, newly submitted application binaries and modified objects must be provided to production server 920 executing runtime software environment 940 via code deployment path at 950 for code promotion.

Although only one tester workstation is illustrated in FIG. 9, the functional workflow may support a multiple tester environment. On successful completion of quality assurance activities performed at point 930, the tested application may be promoted, or deployed, to production via production code deployment path at 960 for execution in production server 920 positioned to deliver customer value.

The arrangement illustrated in FIG. 9 may provide for time stamping of each revision received from developers operating configuration engine 910. The system may automatically track object revisions and storing these revisions with time stamps in the relational database. Production server 920 may execute built-in metadata designers and editors tailored to meet developer needs. The designers and editors may enable developers to readily extend or alter existing meta-object functionality. For example, an existing schema, dictionary, and objects may be cloned to formulate the basis for a new revision of the software application. In this arrangement, the system may enable an instant assignment of any instance revision label to be promoted into "productive-use" and enable explicit support for creating a "test region" change control relationship between cloned siblings.

Usage Example

The provided example is for a web, or Internet, browser based enterprise email messaging system software application requiring a new function to be added. The initial version of the browser based email messaging system software application is configured to provide the following distribution functions: "From:" for identifying the message originator, "To:" for sending to mail recipients, and "Cc:", i.e. carbon-copy, for sending a 'copy' to additional identified mail recipients.

In this example, a programmer may wish to add a function to the initial software application version to form a new version of the application wherein the added function is realized. In order to introduce this new function, the initial version requires changes and/or modifications to realize this additional function. The new, or additional, function is for a "Bcc:", i.e. blind-carbon-copy, distribution capability. The "Bcc:" distribution capability involves providing copies of the original message to be distributed without publishing or making available the individuals' email addresses when marked using "Bcc:" to the recipients copied using the "To:" and "Cc:" distribution capabilities.

In this example, it is also desirable to simultaneously deploy the initial and new system software application versions for productive use, where the system may configure users and assign access to either the initial version or the new version realized from modifying the initial version. In this example, a user may access a production instance providing "From:", "To:", and "Cc:" distribution functions. A second user, may simultaneously access a different or separate production instance providing "From:", "To:", "Cc:", and the new "Bcc:" distribution functions. Access control and logon methods for manage users in a production environment sufficient for realizing such an implementation is understood to those skilled in the art.

The provided example is disclosed in two parts. Each part demonstrates how a new function is added to an existing email messaging system software application for introducing "Bcc:" distribution functionality. The first part represents how standard methodology is used to add the desired "Bcc:" function. The second part represents how the meta-object SDLC methodology is used to add the same desired "Bcc:" distribution functionality.

Bcc Realized Using Standard Workflow

Standard methodology and workflow incorporates the new function into the existing system software application by changing and/or modifying the existing version of the binary code for the existing software application version to form a new version.

Figure 10:
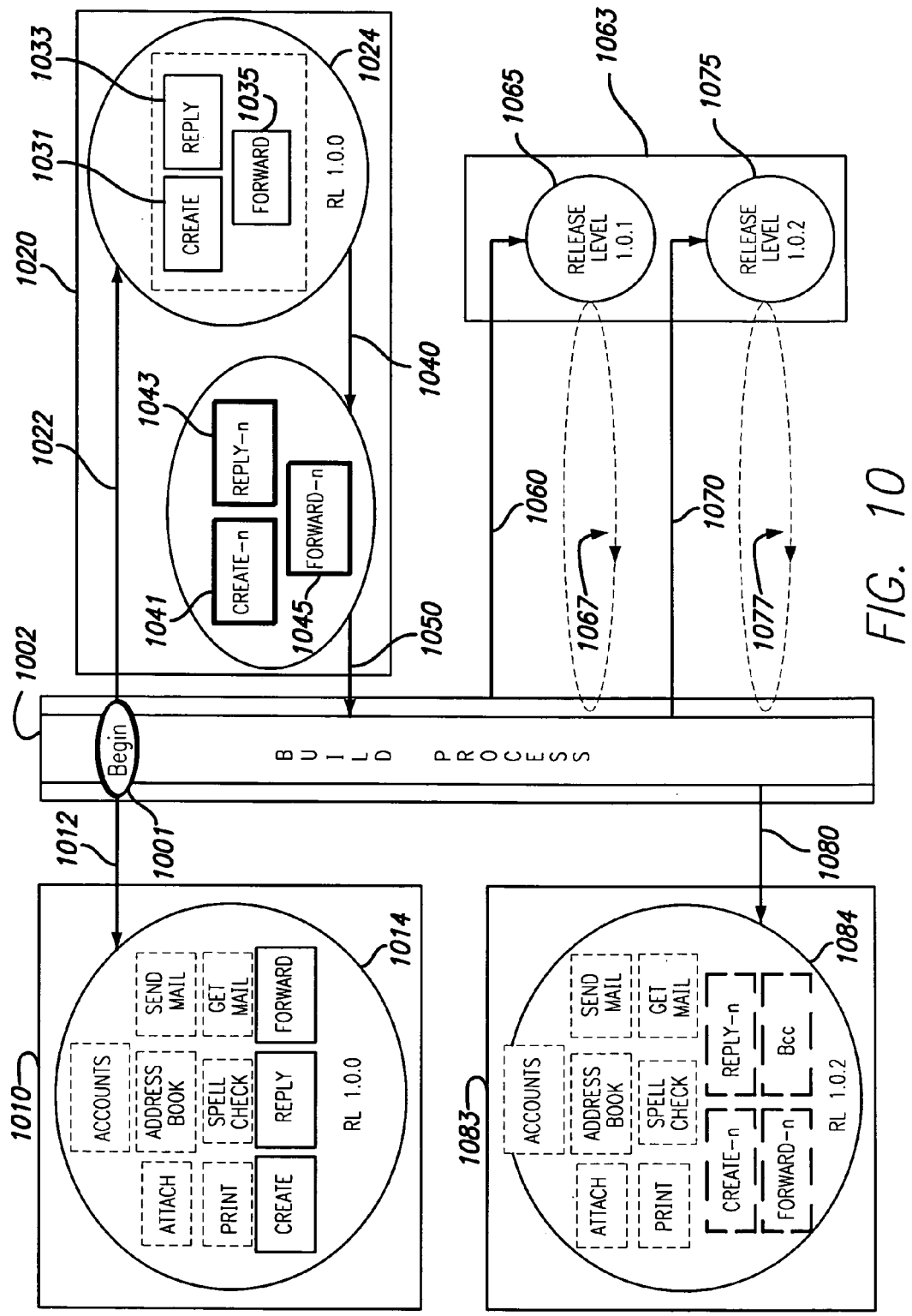
FIG. 10 is an example of incorporating a new function is incorporated into an existing system software application by changing and/or modifying existing binary code.

From FIG. 10, at point 1001 release level 1.0.0 (RL 1.0.0) is available for distribution from a first hardware environment or stack 1002 executing a build process. In this example, distribution involves providing RL 1.0.0 from the build process to production environment 1 1010 via the distribution path 1012. Production environment 1 executes RL1.0.0 1014 configured for customer use. Customers may access RL1.0.0 From:, To:, and Cc: email messaging features and functionality embedded in the create, reply, and forward DLLs as illustrated in FIG. 10.

Distribution also involves providing RL 1.0.0 from the build process to development environment 1 1020 via the distribution path 1022. Development environment 1 executes RL1.0.0 1024 configured for programmer use. Programmers may also receive and access the raw binaries used to build RL 1.0.0 for the purpose of adding, changing, or removing features and functions. For example, a programmer may obtain the RL 1.0.0 of the email system software and may "check out" a copy of entire source code from build process 1003, in this example RL 1.0.0, for execution within his computer hardware and within development environment 1020. The development environment 1020 may support multiple programmers. Source code control and distribution are made available by the software control mechanism within the build process as previously discussed.

In this example, the production environment 1 1010, or second hardware environment, is executing a single instance of RL1.0.0 1014 for providing messaging distribution functionality to customers/users of the system. The initial RL 1.0.0 software is configured to provide distribution functions including "From:" for identifying the message originator, "To:" for sending to mail recipients and a "Cc:" carbon copy to 'copy' additional mail recipients.

From a third hardware environment, the programmer or programmers modify the existing version of the source code contents or binaries for three shared library or dynamic link libraries (DLLs), create (creating a new email) at point 1031, reply (replying to an email) at point 1033 and forward (forwarding an email) at point 1035. The three DLLs may be cloned at path 1040, ready for modifications, such as addition of the Bcc: function.

Microsoft DLLs are presented as an exemplary development and deployment framework for software development activities. The present design is not limited to DLL implementations and may be used in other development and deployment frame works wherein changes are made to existing objects, functions, files, or data.

The modified binaries used to realize new DLLs incorporating new changes to produce modified source code reflecting the "Bcc:" function is checked in, illustrated as three modified DLLs in FIG. 10, create-n at 1041, reply-n at 1043 and forward-n at 1045, for submission to the internal versioning control system at path 1050 within build process 1002. A new build of the entire email system, such as release level 1.0.1 (RL 1.0.1), is generated under configuration control, using build process 1002, ready for quality assurance verification, and including the desired "Bcc:" function. The entire email messaging system configuration may include numerous DLLs, such as for inserting attachments, spell checking, address book, print, font selection, and so forth.

In a parallel, but separate effort, a database manager updates the existing schema by defining field names, field lengths, associations, and so forth, sufficient to include and support new attributes for the "Bcc:" function. The database manager then stores a copy of the modified schema reflecting the new updates in the dictionary.

A quality assurance tester checks out the newly built RL 1.0.1 system 1065 from build process 1002 and begins to test the build/release including the "Bcc:" function with his computer hardware within the test environment 1063, representing the fourth hardware environment.

Defects may be found in the initial release or releases of new functions. Defects are repaired by the responsible programmer(s) and then re-submitted under version control for inclusion into the code fixes at point 1067 for incorporation into the next test release build process.

A new release is built, or generated, using the build process at path 1070, in this example release level 1.0.2, ready for further testing. Release level 1.0.2 at this point still includes the new "Bcc:" function, improved over the version 1.0.1 release. The quality assurance process continues to cycle through the current workflow defect discovery defect repair loop 1077 until a defect free stable (or near defect free and stable) software application build is achieved, such as in this example release level 1.0.2 1075 replacing release level 1.0.1 within test environment 1 1063. Although only two quality assurance or test cycles are shown if FIG. 10, in this example, all code fixes at point 1077 ultimately form production release level 1.0.2. Release level 1.0.2 of the software application is determined ready for operational use and is placed into production at path 1080. Alternately, a fifth hardware environment may execute a single application of RL1.0.2 1084 in production environment 2 1083. The release then includes a fully operational "Bcc:" function, shown in release 1.0.2 1084.

Although multiple loops may be required for cycling through the defect discovery defect repair loop 1077, release level 1.0.2 is shown to have resulted from two separate internal test versions. In this example, release levels 1.0.1 and 1.0.2, were required to produce the desired "Bcc:" functionality in a defect free stable software build/release.

The standard methodology and workflow may provide simultaneous support for more than two production environments by adding additional dedicated separate hardware environments, where each added hardware environment supports one additional software release level for simultaneous access in combination with previous application version release levels. Certain functionality of environments may be combined, and for example the implementation of FIG. 10 may occur on fewer than five distinct hardware devices or in five hardware environments, but five hardware instances need to be employed.

Bcc Functionality Realized Using the Meta-Object Workflow

The same "Bcc:" function may be realized by following the present meta-object methodology and workflow as previously discussed with respect to, for example, FIGS. 5 and 6. For purposes of this discussion, the meta-object methodology treats the email messaging distribution functions as a variable coded function, or non-fixed coded function, wherein the variable coded distribution functions are currently defined, saved, and stored as objects in the meta-object system RDBMS.

In the case or situation where some portion of the modifications involve changes to the fixed coded functions within the software application, the runtime utility recognizes an updated time stamp for each source code change within the runtime utility environment, and recompiles these portions of the software application as dictated by the current time stamp associated with each fix coded function change.

Since the provided example does not involve any fixed code functions, the runtime utility software environment, e.g. a plurality of dlls, will not be modified. Only content items are modified, shown previously in FIG. 7 at point 740, with an updated time stamp stored in the RDBMS. Such content items may be recompiled.

The present example begins at point 1101, where the initial or existing version, including fixed code functions and variable code content items functions, have been compiled based on a previous time stamp using runtime utility 1102. The compiled software is delivered from runtime utility 1102 using the path 1105 to form a first production instance 1 1110, as release level 1.0.0, positioned for productive use executing within meta-object system 1100. The RL 1.0.0 production instance provides user functionality and features based on the existing content items for "From:", "To:", and "Cc:" mail recipient distribution features stored in the database at point 1121. The meta-object SDLC methodology and workflow incorporates the new "Bcc:" function into the existing system software application, RL 1.0.0, from changing and/or modifying the existing RDBMS database content items from the first software application version shown as RL 1.0.0 at 1110, illustrated in FIG. 11.

First, a programmer may clone the existing RL 1.0.0 database at point 1123, and underlying schema used to create RL 1.0.0, into a new copy of the database at point 1125. The programmer may modify the newly cloned database at point 1125 by changing the content items at point 1129 to form a new database at point 1143, previously shown in FIG. 7A. The programmer may input at point 1131 add, change, or remove content items 1129 sufficient to include the new "Bcc:" function in database 1143. In this example part, the programmer may clone and/or copy existing rows and/or columns within the database for the existing "create" at point 1111, "reply" at point 1113, and "forward" at point 1115 distribution functionality and make changes to affect the desired "Bcc:" function. The programmer may also modify and/or create a new schema including attributes, associations, and relationships in support of realizing "Bcc:" functionality. The present design may time stamp at point 1133 each change or modification of content items made at point 1129.

After the desired modifications are complete, the system invokes runtime utility 1102 to compile the newly added function into the software application. In this example, the new function is illustrated as create-n at point 1161, reply-n at point 1163, and forward-n at point 1165, and these are all included into RL 1.0.1 at point 1160. RL 1.0.1 is positioned for quality assurance activities, executing as a separate application instance at point 1160 within meta-object system 1100. The runtime utility compiles only the portion of the application that has changed. In this example, all fixed code portions of the email messaging system software application exhibit an unchanged time stamp such that the runtime utility does not recompile these coded portions. Only variable coded content items exhibiting an updated time stamp, reflecting one or more content item changes are recompiled when creating RL 1.0.1. The system then combines, within the runtime environment, the dlls produced from the runtime utility recompilation with the previously existing unchanged dlls to form a new instance of the software application.

Typically, defects are found in the initial release or releases of new functions, e.g. RL 1.0.1. Defects are repaired by the responsible programmer(s) by modifying the content items at 1129 and then re-submitted the fixes as part of database 1143 for incorporation into the next test build instance generated by runtime utility 1102.

A new release level 1.0.2 is built, or generated, using the runtime utility, in this example release level 1.0.2, ready for further testing. The quality assurance process continues to cycle through meta-object SDLC workflow defect discovery defect repair loop 1145 a sufficient number of times until a defect free stable software application build is achieved/obtained, such as in this example release level 1.0.2.

Figure 11:
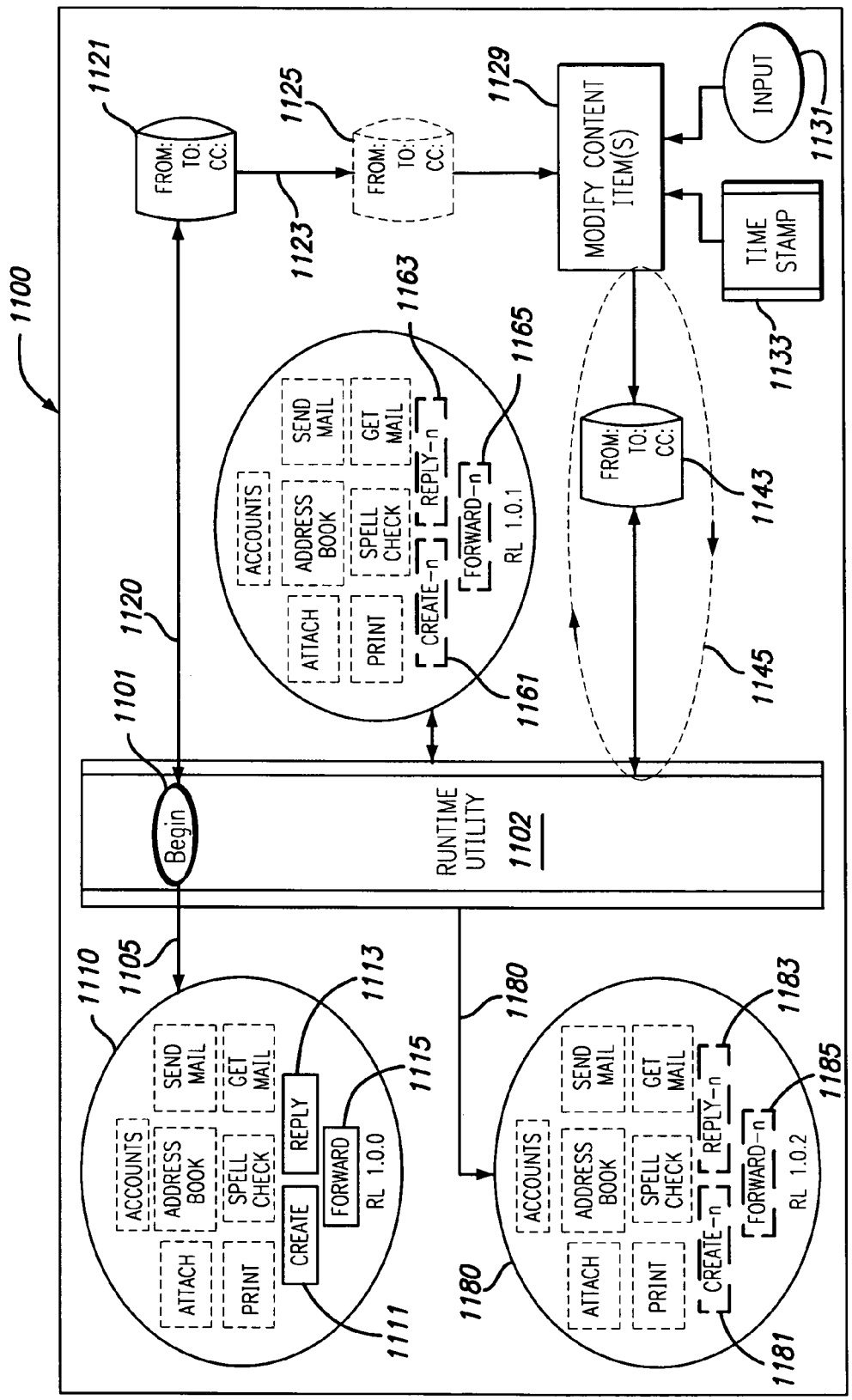
FIG. 11 illustrates an example where a new function is incorporated into an existing system software application by changing and/or modifying existing RDBMS database content items.

Although only one quality assurance or test cycle is illustrated in FIG. 11 at point 1145, the modifications to content items at point 1129 ultimately form a second production instance at release level 1.0.2. The production instance may result from multiple passes through code fixes loop at point 1145, in accordance with the present design, for propagating version changes via object content definitions within the database. In this example, release level 1.0.2 of the software application is determined ready for operational use and is placed into production at path 1175, executing as a separate application instance 1180 within meta-object system 1100. This application instance includes the desired "Bcc:" functionality for create-n at 1181, reply-n at 1183, and forward-n at 1185. Although multiple loops may be required for cycling through the defect discovery defect repair loop at 1145, release level 1.0.2 is shown to have resulted from two separate internal test release levels. In this example, release levels 1.0.1 and 1.0.2 were needed to produce the desired "Bcc:" functionality in a defect free stable software build/release.

The meta-object system 1100 provides simultaneous support for multiple application instances executing from within one hardware environment. Thus, in the foregoing example, application instances include a first production instance, exhibiting RL 1.0.0 functionality, in combination with a test instance, exhibiting RL 1.0.1 functionality, and a second production instance, exhibiting RL 1.0.2 functionality.

In summary, when following the present design's meta-object system SDLC workflow model, more efficient enterprise application development efforts and productive use may be realized. Such improved performance may result from a single live instance of the application software executing from a single suite or single hardware/software execution environment supporting code creation, quality assurance, and production.

The meta-object system may be employed, including the rules, schemas, dictionaries, modules, servers, and components, to resolve other types of transactions using a meta-object system arrangement. In essence, the meta-object system provides the software application owner with the ability to interact with the present system and modify existing content items. Such items may include but are not limited to debt terms prepared "on-the-fly" and code modifications for just in time compilation.

In general, the present system may be employed to rapidly change rules in conjunction with a particular strategy and promote those rules into a production environment, generally transparent and without interruption to the users accessing the production instances.

In short, the present design may be configured for executing multiple release levels as separate instances within a single hardware environment. To include a new function, or other software change/modification, the present design may compile and re-compile only portions of the application and not the entire source code to add a new function or new functionality to an existing version of a software application.

Using meta-objects may allow customer-specific variations in desired behavior to be specified in the data, greatly reducing the need to engage in the costly cycle that custom programming and one-off binaries can initiate. Thus, the meta-object system may enjoy a lower total cost of ownership over current designs as long-term maintenance savings accrue.

While primarily described herein with respect to an exemplary system and method for developing and distributing application features and functions for supporting an enterprise email message application, the invention and disclosure herein are not intended to be so limited. For example, the present method is well suited for transaction resolution in a debt settlement scenario using rules stored in the database. As noted, the present design may be employed in a variety of scenarios, further including but not limited to developing and distributing application features and functions for other instruments, such as contractual obligations, payroll obligations, and so forth.

Note that while certain meta-object system implementation examples are provided herein, these examples are meant to be illustrative and not limiting as to the functionality of the present system and method. Other examples and implementations are possible and this document should not be limited by the examples presented. Other examples of using meta-objects and meta-data may be realized using the current design.

By the foregoing description, an improved system and method for developing and distributing software application code have been described. The improved system and method may be substantially or completely internet based such that the development team and application users can access the software realized from use of the meta-object system SDLC methodology to implement transaction based applications, such as manage debt, from a platform providing, for example, Internet browsing capabilities.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for providing a software application development environment in conjunction with a computing device, the method comprising:
    providing a database on the computing device;
    enabling users to provide an update to an element of the database, wherein the element is associated with an object;
    tracking revisions to elements of the database by establishing time stamps for each stored element changed at a specified time;
    enabling a user to select an applicable time period comprising a beginning time point and an end time point; and
    assembling elements for execution based on time stamps for only the selected applicable time period between the beginning time point and the end time point.

2. The method of claim 1, wherein the database comprises a relational database and each object comprises a meta-object.

3. The method of claim 2, wherein the relational database has associated therewith a meta-object specification specifying the meta-object contents of the relational database.

4. The method of claim 1, wherein enabling the user to assemble elements comprises enabling the user to compile the most recently time stamped elements for selected elements in the database.

5. The method of claim 1, further comprising enabling multiple users to alter elements within the database and enabling multiple users to assemble time stamped elements for execution.

6. A software application development environment system implemented using a computing device, the system comprising:
    a database provided on the computing device, the computing device configured to enable users to provide an update to an element of the database, wherein the element is associated with an object;
    time stamp tracking software configured to enable revisions to elements of the database by establishing time stamps for each stored element changed at a specified time; and
    an assembler configured to enable a user to select an applicable time period comprising a beginning time point and an end time point; and enable the user to assemble elements for execution based on time stamps for only the selected applicable time period between the beginning time point and the end time point.

7. The system of claim 6, wherein the database comprises a relational database and each object comprises a meta-object.

8. The system of claim 7, wherein the relational database has associated therewith a meta-object specification specifying the meta-object contents of the relational database.

9. The system of claim 6, wherein the assembler is configured to assemble elements and enables the user to compile the most recently time stamped elements for selected elements in the database.

10. The system of claim 6, wherein the computing device is further configured to enable multiple users to alter elements within the database and enable multiple users to assemble time stamped elements for execution.

11. A method for tracking objects stored in a relational database at least partially implemented on a computing device, the method comprising:
    time-stamping altered objects in the database, wherein altered objects comprise newer objects formed from the objects;

storing the objects and associated time stamps in the database;

identifying an applicable time period comprising a beginning time point and an end time point; and assembling selected objects for execution having time stamps within the identified time period, including at least one altered object having a newer time stamp than a previous version of the altered object.

12. The method of claim 11, wherein the database comprises a relational database and each object comprises a meta-object.

13. The method of claim 12, wherein the relational database has associated therewith a meta-object specification specifying the meta-object contents of the relational database.

14. The method of claim 11, wherein assembling selected objects enables the user to compile the most recently time stamped objects for selected objects in the database.

15. The method of claim 11, further comprising enabling multiple users to alter objects within the database and enable multiple users to assemble time stamped objects for execution.

16. A method for executing an application using a computing device, the method comprising:

time stamping changed meta-objects contained in a database at least partially implemented in the computing device;

querying the database for at least one meta-object having a specific time stamp within a selected applicable time period between a selected beginning time point and a selected end time point; and compiling at least one object in the database determined based on the querying.

* * * * *